(12) United States Patent
Li et al.

(10) Patent No.: US 11,226,960 B2
(45) Date of Patent: Jan. 18, 2022

(54) NATURAL-LANGUAGE DATABASE INTERFACE WITH AUTOMATED KEYWORD MAPPING AND JOIN-PATH INFERENCES

(71) Applicants: INTERNATIONAL BUSINESS MACHINES CORPORATION, Armonk, NY (US); THE REGENTS OF THE UNIVERSITY OF MICHIGAN, Ann Arbor, MI (US)

(72) Inventors: Yunyao Li, San Jose, CA (US); Christopher J. Baik, Ann Arbor, MI (US); Hosagrahar V. Jagadish, Ann Arbor, MI (US)

(73) Assignees: International Business Machines Corporation, Armonk, NY (US); The Regents of the University of Michigan, Ann Arbor, MI (US)

( * ) Notice: Subject to any disclaimer, the term of this patent is extended or adjusted under 35 U.S.C. 154(b) by 249 days.

(21) Appl. No.: 16/731,564

(22) Filed: Dec. 31, 2019

(65) Prior Publication Data
US 2021/0200761 A1    Jul. 1, 2021

(51) Int. Cl.
*G06F 16/00* (2019.01)
*G06F 16/2452* (2019.01)
(Continued)

(52) U.S. Cl.
CPC .. *G06F 16/24522* (2019.01); *G06F 16/24544* (2019.01); *G06F 16/9024* (2019.01); *G06F 40/30* (2020.01)

(58) Field of Classification Search
CPC ......... G06F 16/24522; G06F 16/24544; G06F 16/9024; G06F 40/30
See application file for complete search history.

(56) References Cited

U.S. PATENT DOCUMENTS

| 2019/0205726 A1* | 7/2019 | Khabiri | G06F 16/243 |
| 2019/0243831 A1* | 8/2019 | Rumiantsau | G10L 15/26 |
| 2021/0019309 A1* | 1/2021 | Yadav | G06F 16/245 |

FOREIGN PATENT DOCUMENTS

| CN | 109133374 | 12/2018 |
| WO | 2014105677 | 7/2014 |

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Leslie Wong
(74) *Attorney, Agent, or Firm* — Schmeiser, Olsen & Watts; Abdy Raissinia

(57) ABSTRACT

A natural language interface for databases (NLIDB) component of a database-management system receives a user-submitted natural-language query. The NLIDB parses the query into keywords and maps each keyword onto a corresponding query fragment that identifies a predicate of a non-join condition, or other type of expression, of a structured query. The NLIDB selects an optimal mapping for each keyword with the aid of a Query Fragment Graph (QFG) that counts the number of occurrences of each fragment, and the number of co-occurrences of each pair of fragments, in previously received structured queries. The NLIDB then uses the QFG, optionally augmented by contextual data, to select join paths most likely to be consistent with the semantic intent of the user. The NLIDB generates a structured query that incorporates the mapped query fragments and selected join paths and forwards. The structured the query is then forwarded to downstream DBMS components.

21 Claims, 7 Drawing Sheets

(51) Int. Cl.
      *G06F 40/30*      (2020.01)
      *G06F 16/901*     (2019.01)
      *G06F 16/2453*    (2019.01)

(56) References Cited

OTHER PUBLICATIONS

Agrawal, S. et al; Dbxplorer: a system for keyword based search over relational databases. In Proceedings 18th International Conference on Data Engineering, pp. 5-16, 2002.

Baik, C. et al. ; Bridging the Semantic Gap With SQL Query Logs in Natural Language Interfaces to Databases, pp. 1-12, Jan. 31, 2019.

Freitas, A. et al.; Natural Language Queries Over Heterogeneous Linked Data Graphs: A Distributional-Compositional Semantics Approach, pp. 279-288, Feb. 24, 2014.

IPCOM000227668D; Graph-Based Method and System for Querying and Analyzing Enterprise Data Warehouse Via Natural Language Interface, May 10, 2013.

IPCOM000255223D; Recommending Queries by Extracting Semantic Graph Patterns From Digital Exhaust, Sep. 11, 2018.

Li, F. et al.; Constructing an interactive natural language interface for relational databases. Proc. VLDB Endow., 8 (1):73-84, Sep. 2014.

* cited by examiner

US 11,226,960 B2

NATURAL-LANGUAGE DATABASE INTERFACE WITH AUTOMATED KEYWORD MAPPING AND JOIN-PATH INFERENCES

BACKGROUND

This invention relates in general to computerized database-management systems (DBMSs) and in particular to Natural Language Interfaces for Databases (NLIDBs).

An NLIDB is a database-management system (DBMS) component or discrete software application that translates natural-language database queries into a formal, structured database-query language, such as Structured Query Language (SQL), that can be processed by a DBMS.

SUMMARY

Embodiments of the present invention comprise systems, methods, and computer program products for a natural language interface for databases (NLIDB) system. The system parses a user-submitted natural-language query into tokens that represent keywords and uses similarity models, metadata, or other context-inferring tools to map each keyword onto one or more candidate query fragments. Each query fragment identifies: i) an expression of a structured query or a predicate of a non-join condition of a structured query and ii) a clause of the structured query that adds context to the expression or predicate. The NLIDB selects a subset of mappings for each keyword that map the keyword onto query fragments that have the highest degrees of similarity to the keyword. Combinations of the selected mappings are organized into distinct candidate mapping configurations that each specify one mapping for each keyword. The system selects an optimal configuration by referring to information stored in a Query Fragment Graph (QFG) that counts the number of occurrences of each fragment in structured queries previously submitted to the database. The system then, using information stored in the QFG, counts the number of times that each possible pair of query fragments that occur in the optimal configuration co-occurred in a previously submitted query. The system selects an optimal join path as a function of the relative numbers of such co-occurrences, and then selects an optimal configuration as a function of the number of optimal join paths occurring in each candidate configuration. The system generates a structured query most likely to be consistent with the semantic intent of the user by incorporating the selected query fragments and join paths into the structured query. The system forwards the structured query to downstream DBMS components that process the query with conventional query-optimization and query-servicing functions.

DETAILED DESCRIPTION

Figure 1:
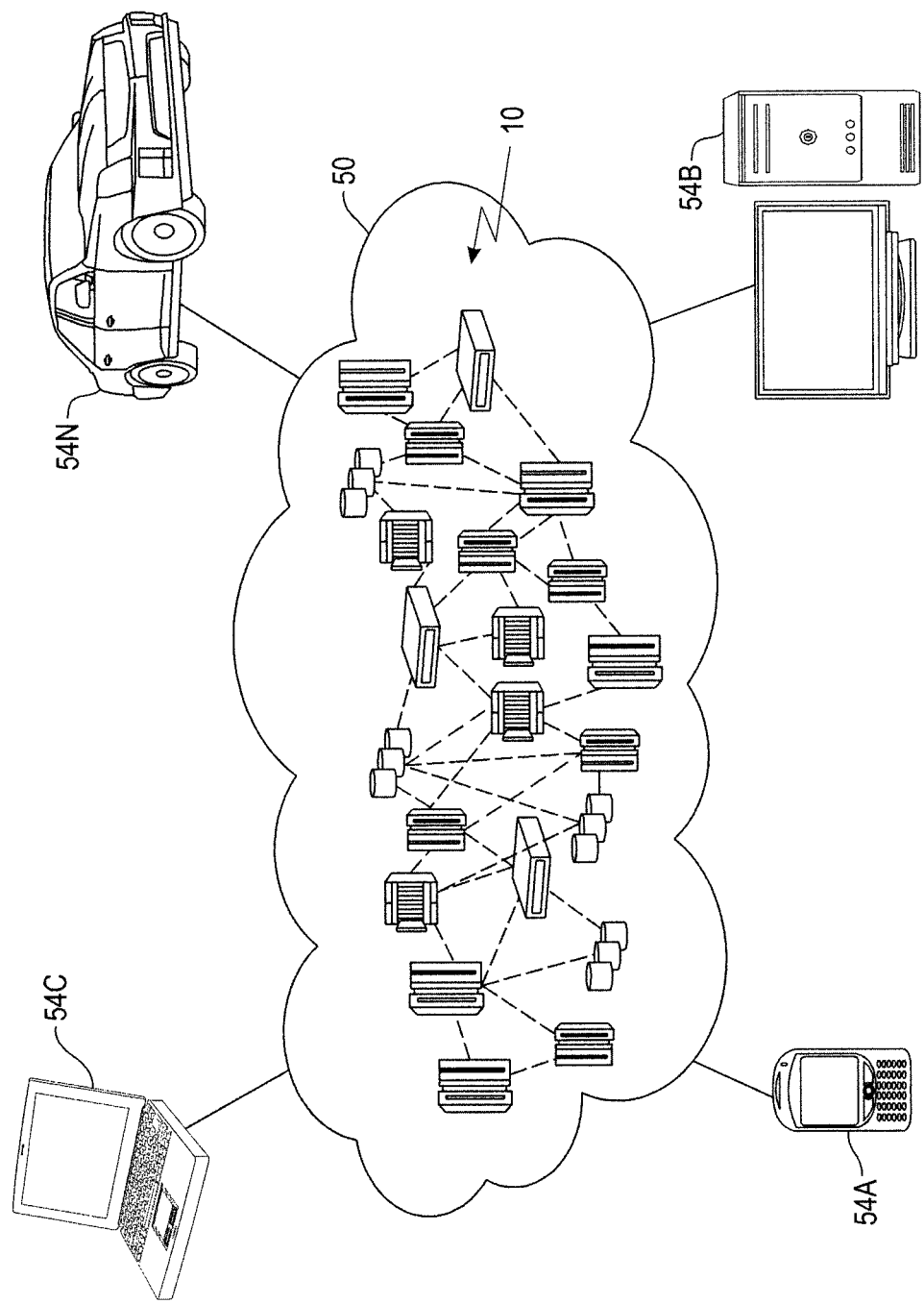
FIG. 1 depicts a cloud computing environment according to an embodiment of the present invention.

A Natural Language Interface for Databases (NLIDB) is a DBMS component or other software module that translates DBMS users' natural-language database queries (NLQs) into a formal, structured database-query language, such as Structured Query Language (SQL), that can be submitted directly to the DBMS.

This translation process requires an NLIDB to bridge a "semantic gap" between an NLQ and its corresponding structured query. This involves inferring semantic meaning from the NLQ's ambiguous or vague natural language and then ensuring that the structured query directs the DBMS to retrieve the data that the user intended to access.

One step of this procedure is mapping keywords extracted from the NLQ onto database elements like stored values, attributes, and relations. For example, given an NLQ "List the names of users who purchased one of our computers in 2019," an NLIDB might map the natural-language keyword "names" onto "FirstName" and "LastName" columns (or "attributes") of a "CustomerName" database table (or "relation"). This mapping helps the NLIDB configure a structured query that requests access to data stored in the "FirstName" and "LastName" columns.

It may be possible to map a keyword onto more than one set of database elements. An NLIDB might, for example, be faced with a decision whether to map a keyphrase "purchased computer products" onto either the "DesktopSystems" and "NotebookSystems" columns of a "Product-Lines" database table, or onto a "SKU" column of a "PurchaseHistory" table.

Generating a semantically consistent structured query also requires inferring "join paths" that identify database tables or columns that should be merged into an ad hoc data repository from which a DBMS should retrieve query results. A FROM clause of an SQL query, for example, identifies a logical grouping of columns or tables through which a DBMS should search for queried data.

Structured queries requesting information that spans multiple tables or columns may also specify a join path through which the DBMS connects those tables or columns into a single searchable domain. However, a pair of relations or attributes may be connected by more than one join path, and a path may traverse one or more intermediate relations or attributes or may require searching through different numbers of indexes or different numbers of records. Selecting an optimal path can thus reduce a DBMS's query-processing overhead by reducing the DBMS's overall resource consumption, average response times, and total number of database accesses.

It is especially challenging for an NLIDB to map keywords and to infer join paths because NLQs do not expressly identify specific database tables and columns, and structured queries do not identify the semantic meaning of data stored in each table or column. Some known NLIDB systems attempt to map keywords through straightforward word-embedding methodologies or by looking up keywords in a lexical database. Other existing systems rely on a user or administrator to expressly identify preferred join paths, or may select a join path by following simple predefined rules, such as by always selecting the shortest possible path between two tables.

Embodiments of the present invention improve existing NLIDB technology by providing a more accurate automated mechanism for mapping keywords and inferring join paths. This mechanism is based on an intermediate data structure, known as a Query Fragment Graph (QFG), that lists the relative numbers of times that specific query fragments occurred in structured queries previously submitted to a DBMS keywords. A QFG also lists the relative numbers of times that distinct pairs of query fragments co-occurred in a structured query that had previously been submitted to a DBMS. This information helps an NLIDB rank candidate mappings, each of which maps an extracted keyword onto a candidate query fragment, and to identify and rank candidate join paths for pairs of query fragments suggested by the mappings. The NLIDB then, using these frequency counts, similarity measurements, and contextual metadata, incorporates the highest-ranked mappings and join-path inferences into a structured query that represents the intent of the user who submitted the NLQ.

In this way, embodiments provide an improved NLIDB system capable of bridging the semantic gap between a querying user's intent, expressed in natural language, and the meaning of stored data retrieved from the database by the structured query.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
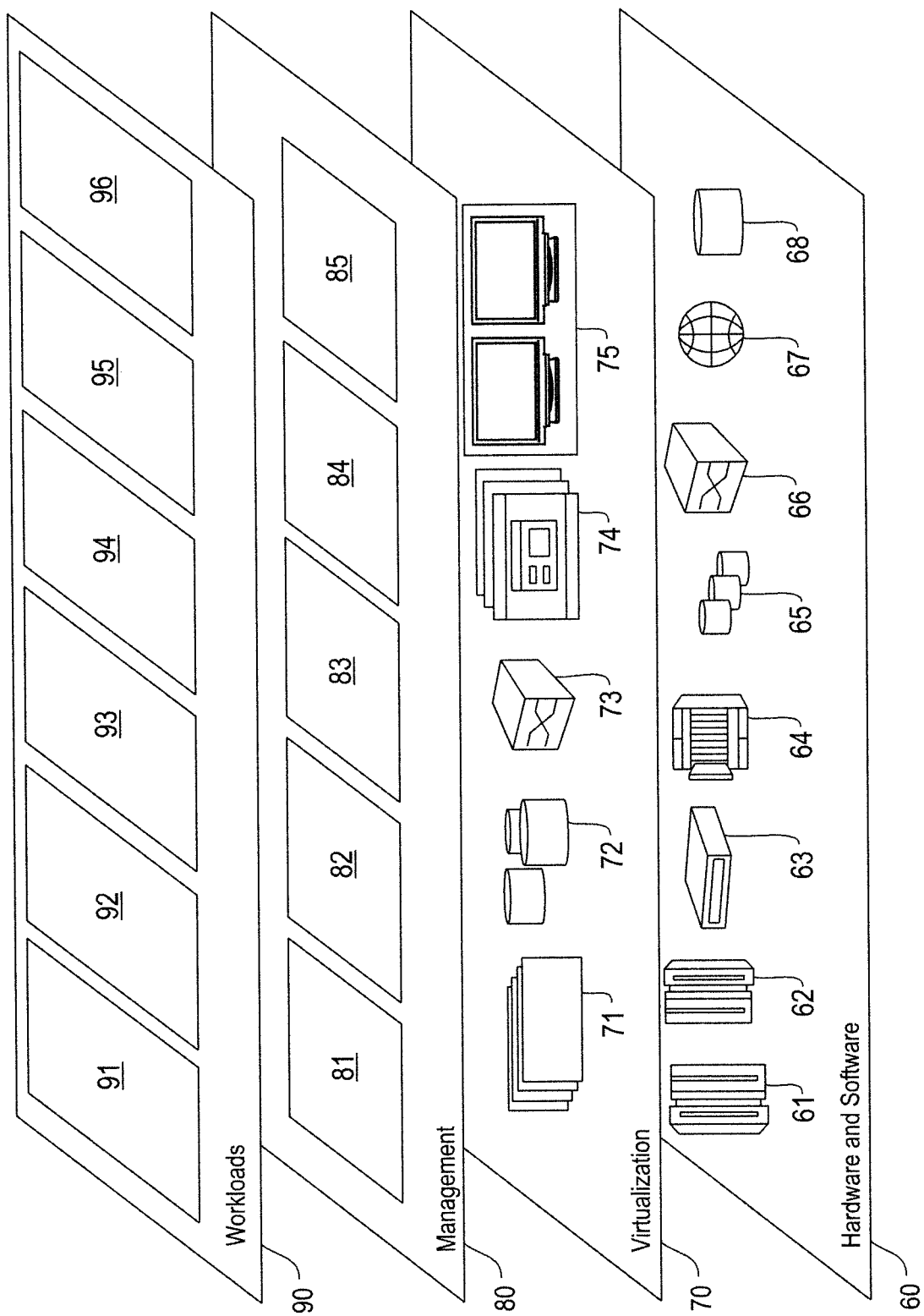
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of natural-language database interfaces with automated keyword mapping and join-path inferences 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
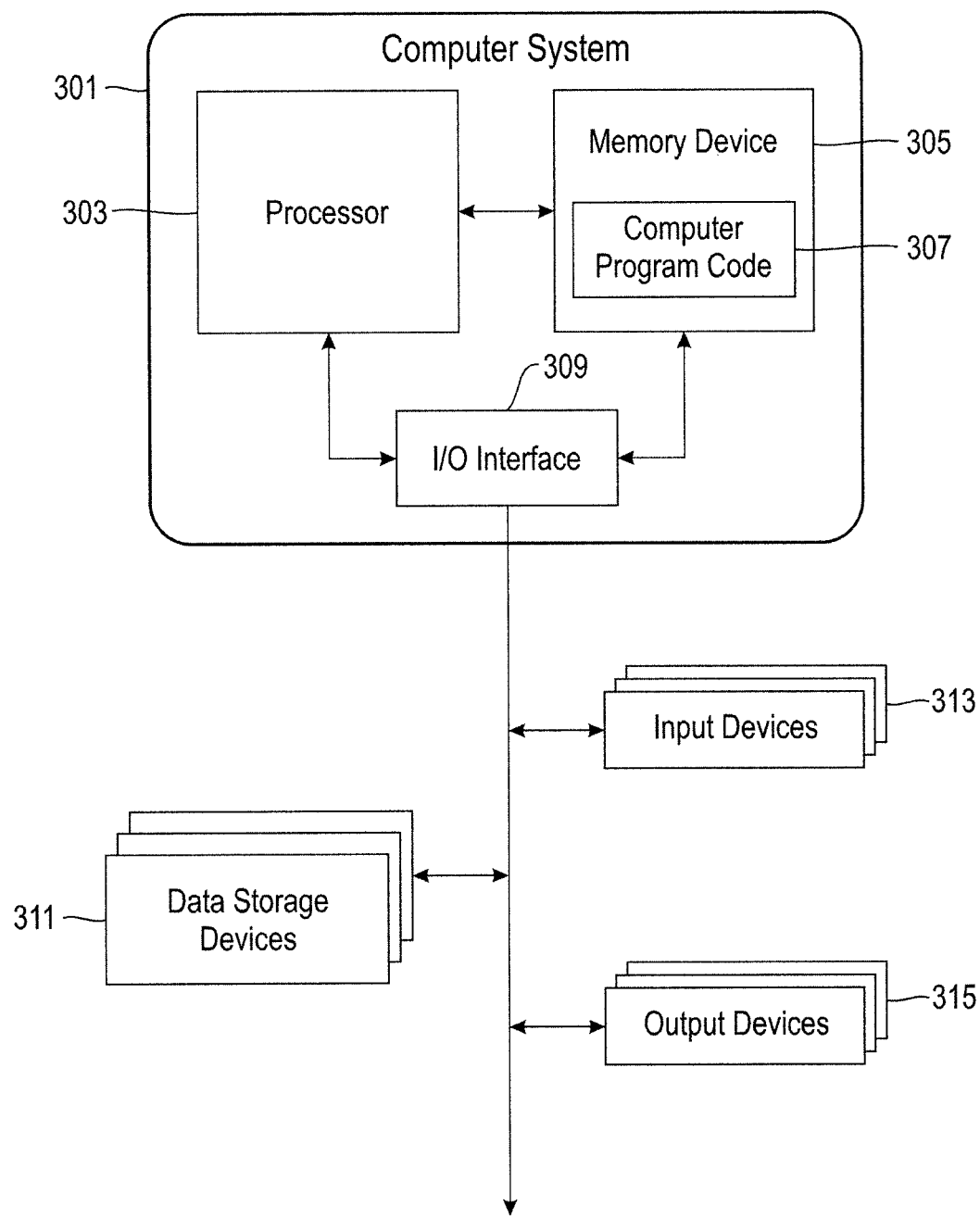
FIG. 3 shows the structure of a computerized platform on which may be implemented embodiments of the present invention.

FIG. 3 shows a structure of a computer system and computer program code that may be used to implement a method for a natural-language database interface with automated keyword mapping and join-path inferences in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for a natural-language database interface with automated keyword mapping and join-path inferences in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for a natural-language database interface with automated keyword mapping and join-path inferences.

Any of the components of the present invention could be created, integrated, hosted, maintained, deployed, managed, serviced, supported, etc. by a service provider who offers to facilitate a method for a natural-language database interface with automated keyword mapping and join-path inferences. Thus the present invention discloses a process for deploying or integrating computing infrastructure, comprising integrating computer-readable code into the computer system 301, wherein the code in combination with the computer system 301 is capable of performing a method for a natural-language database interface with automated keyword mapping and join-path inferences.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for a natural-language database interface with automated keyword mapping and join-path inferences may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for a natural-language database interface with automated keyword mapping and join-path inferences is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
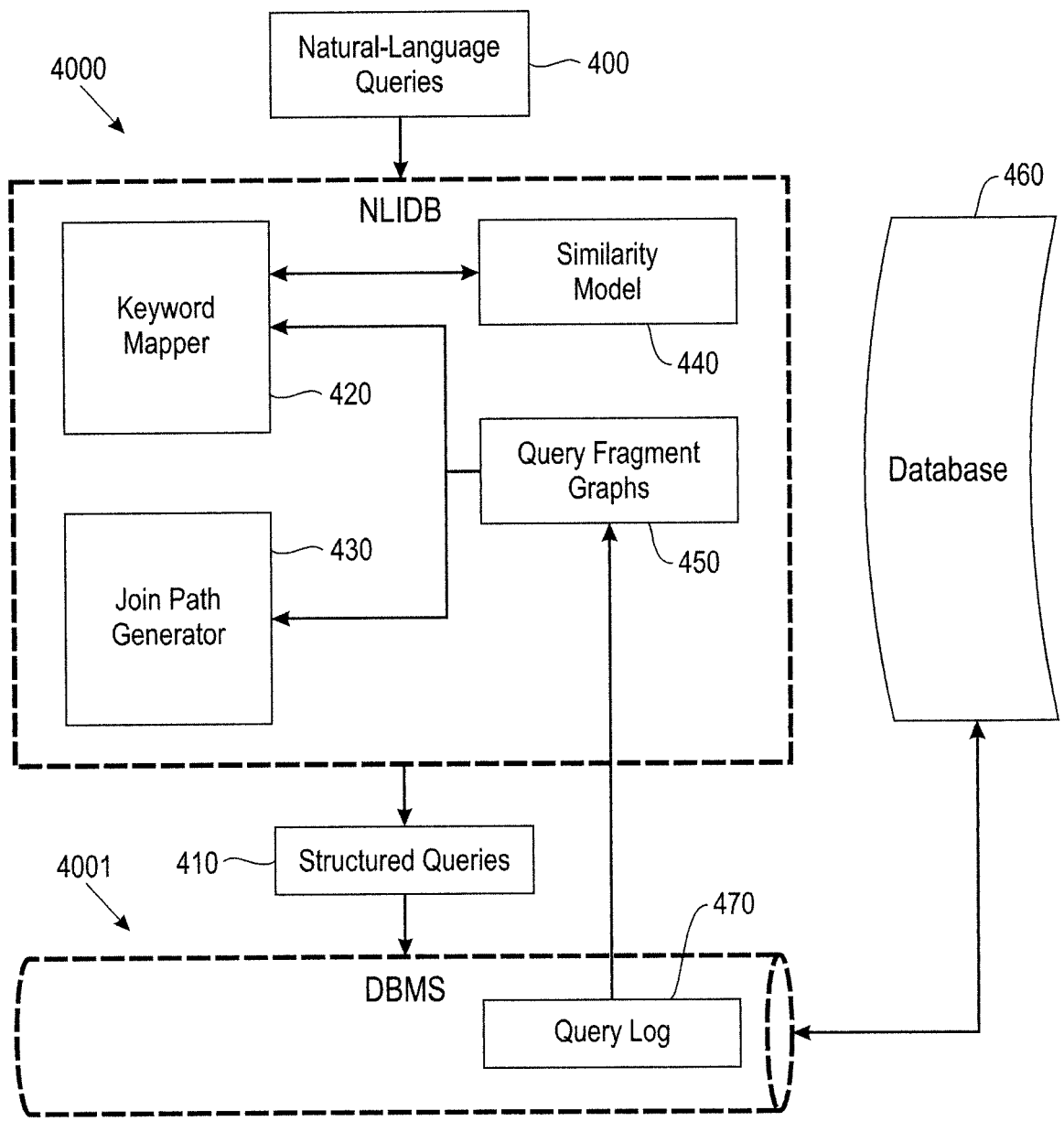
FIG. 4 shows an architecture and operating environment of an improved NLIDB system based on an embodiment of the present invention.

FIG. 4 illustrates an architecture and operating environment of an improved natural-language interface for databases (NLIDB) system 4000 based on an embodiment of the present invention. FIG. 4 shows items 400-470 and 4000-4001. In some implementations, NLIDB 4000 may be configured as an internal component of database-management system (DBMS) 4001.

DBMS 4001 receives and services structured queries 410 that each request access to data stored in tables and columns (identified by schematic relations and attributes) of database 460. Each structured query is formatted in a formal query language, such as Structured Query Language (SQL).

The improved NLIDB 4000 creates some or all of the structured queries 410 by translating user-submitted natural-language queries (NLQs) 400 into a structured query language. NLIDB 4000 submits the resulting translations to DBMS 4001 as the structured queries 410.

This translation procedure is facilitated by specialized components of NLIDB 4000 that provide automated keyword-mapping and join-path inference functionality. This functionality enables NLIDB 4000 to generate structured queries 410 that are semantically consistent with the intent of users that submit corresponding NLQs 400. Keyword-mapping functionality is performed by a keyword mapper 420 module of NLIDB 4000 and join-path inferences are generated by a join path generator 430 module of NLIDB 4000.

The keyword mappings and join-path modules analyze information stored in Query Fragment Graphs (QFGs) 450 that are created by NLIDB 4000 from one or more query logs 470 of DBMS 4001. As will be explained in FIGS. 5-7, a QFG 450 is an undirected graph that identifies the relative frequencies with which specific query fragments occurred in structured queries 410 previously submitted to DBMS 4001, and further identifies the relative frequencies with which specific pairs of the query fragments co-occurred in a single, previously submitted structured query. This document uses the term "query fragment" to identify an ordered pair that comprises a predicate or other non-join expression of a structured query and a context clause, of the query, in which the predicate or expression resides.

Keyword mapper 420 may also employ other aids, such as extrinsically generated metadata or a similarity model 440, to quantify relative degrees of similarity between a keyword and a candidate query fragment. Similarity models 440 are known in the art and can, for example, be implemented as shallow neural networks that have been trained to perform word-embedding operations in order to reconstruct linguistic contexts of words. By comparing the semantic, context-dependent meanings of two linguistic elements (such as the two elements of a keyword mapping), such models may be used to determine a degree of similarity between the inferred meanings of those two elements.

In a typical workflow, NLIDB 4000 receives a natural-language query 400 submitted by a user of DBMS 4001. Keyword mapper 420 extracts a set of keywords from the received NLQ 400, and uses information contained in one or more QFGs 450 to map those keywords onto query fragments. Join path generator 430 uses these mappings, along QFGs 450 and other information that may be culled from metadata, external documentation, or a similarity model 450, to infer optimal join paths that are most consistent with the semantic meaning of the original NLQ 400. NLIDB 4000 then generates a structured query 410 that incorporates the selected query fragments and inferred join paths. The structured query 410 is submitted to DBMS 4001, which continues to service the query through standard DBMS query-optimization and processing procedures.

Figure 5:
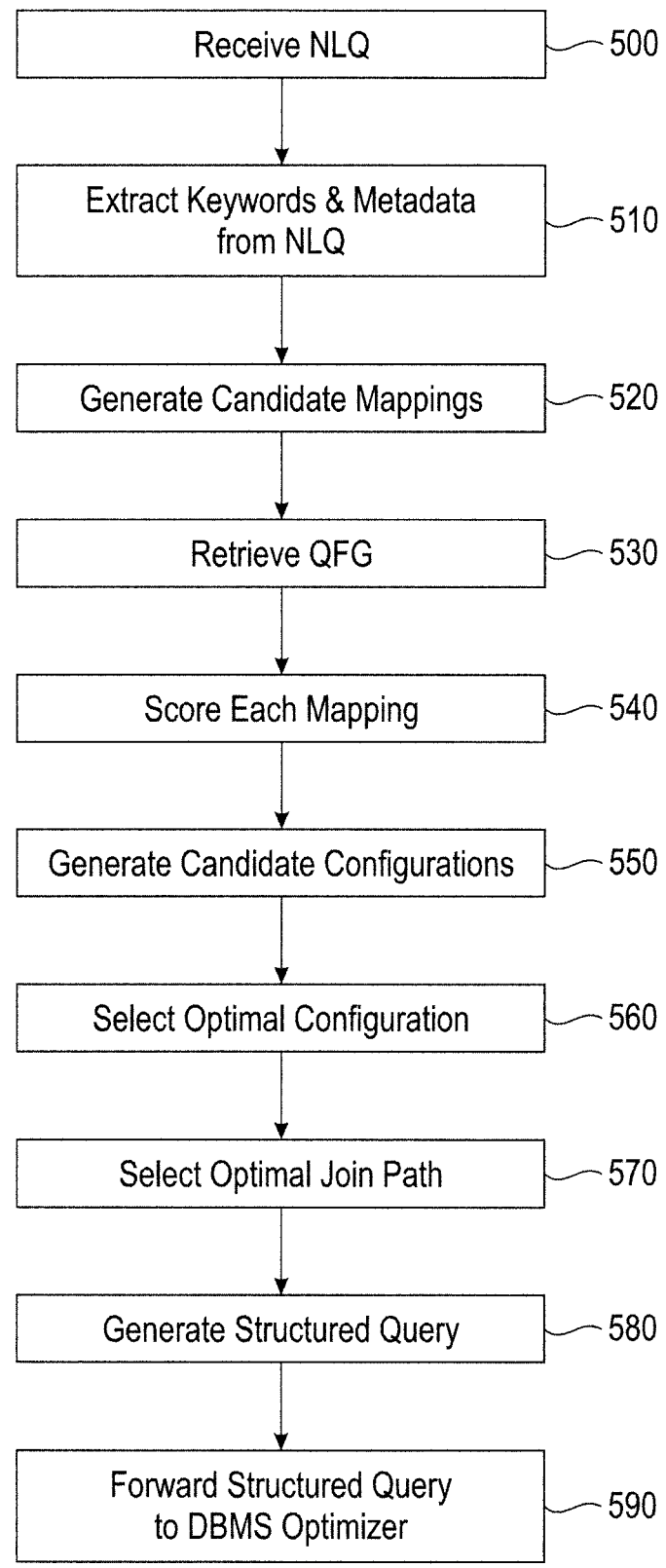
FIG. 5 is a flow chart that illustrates steps of a method for a natural-language database interface with automated keyword mapping and join-path inferences in accordance with embodiments of the present invention.

FIG. 5 is a flow chart that illustrates steps of a method for a natural-language database interface (NLIDB) 4000 with automated keyword mapping and join-path inferences in accordance with embodiments of the present invention. FIG. 5 contains steps 500-590.

In step 500, an improved natural-language interface for databases (NLIDB) 4000 receives a natural-language query (NLQ) 400 from a user or upstream system. NLIDB 4000 may be a standalone software application or may be configured as a component of a DBMS 4001.

NLQ 400 may be phrased in a conversational natural language like English, Japanese, or French. In all cases, the intent of NLQ 400 is to request that DBMS 4001 retrieve, format, and return information stored in database 460.

NLQ 400 may be submitted to NLIDB 4000 by any means known in the art, such as by using an electronic keyboard or keypad to enter text, by speaking to a voice interface, or by interacting with an application that allows users to construct a query by selecting presented options.

In step 510, NLIDB 4000 uses known methods, such as by launching a parsing finite-state machine, or by referring to a lexicon of keywords, to extract from the NLQ 400 keywords capable of being mapped to elements of database 460, extrinsic metadata, or other information that an implementer deems to be capable of helping NLIDB 4000 to infer a semantic meaning of NLQ 400. In some embodiments, this information includes metadata that: provides context by associating a keyword with a formal query-language predicate; identifies a predicate-comparison operator; includes an ordered list of aggregation functions; or consists of a Boolean value indicating whether a particular of an extracted keyword should be grouped with other mappings.

In one example, NLIDB 4000 uses a known method of semantic or non-semantic parsing to tokenize a natural-language query 400 "Return scientific papers after 2000" into a set of tokens. This procedure generates from the NLQ 400 a parse tree that identifies keywords "papers" and "after 2000." In some embodiments, NLIDB 4000 can then, through the use of similarity models 440 or other known methods of quantizing similarities between pairs of text strings, associate each token with one or more candidate database elements, such as column names and table names that refer to database attributes and relations.

In some embodiments, NLIDB 4000 might also use inferential methods to further associate a semantic meaning of extracted keyword "papers" with the semantic meaning of context metadata consisting of a SQL expression in the "SELECT" context. NLIDB 4000 might, for example, infer this association because a node representing token "papers" is a direct child of the node representing token "return" in the parse tree. NLIDB 4000 derives this inference because its semantic parsing procedure or similarity model 440 has associated the semantic meaning of the natural-language word "return" with the semantic meaning of the "SELECT" clause of a structured query 410 formatted in SQL. An embodiment that uses a non-cognitive method based on a keyword lexicon could guess at a similar semantic relationship by referring to a lexicon entry that correlates the natural-language word "return" with the reserved SQL clause "SELECT."

Similarly, NLIDB 4000 associates extracted keyword "after 2000" with a predicate-operator metadata consisting of SQL operator ">" because both a semantic-parsing operation and a lexicon-lookup procedure would associate the semantic meaning of the word "after" with the semantic meaning of operator ">."

Using these, or other known similarity-quantification techniques desired by an implementer, NLIDB 4000 attempts to map each keyword onto one or more query fragments that have semantic meanings related to a likely semantic meaning of the keyword. In some embodiments, inferring these semantic meanings may involve the consideration of metadata, or may comprise cognitive methods of text analytics, semantic analytics, or other applications of artificial intelligence. For example, an embodiment might use machine-learning technology to train NLIDB 4000 to guess semantic meanings of keywords or database elements identified by query fragments or to recognize degrees of similarity between pairs of semantic meanings.

In step 520, NLIDB 4000 generates a set of candidate keyword mappings for the keywords extracted in step 510 by submitting those keywords to keyword mapper module 420. Each keyword mapping consists of a triplet: i) a keyword extracted in step 510; ii) metadata values identified in step 510 as being associated with the keyword; and iii) a corresponding query fragment onto which the extracted keyword is mapped. In embodiments in which keyword mappings include more than one type of metadata, a mapping may consist of more than three ordered elements. For this reason, the exemplary keyword mappings described in this text are represented as simple ordered pairs that omit any metadata elements. But regardless of representational convention, each keyword mapping maps one of the keywords extracted in step 510 to a candidate query fragment built from one of the database elements or structured-query expressions identified in step 510 as being semantically similar in some way to the keyword.

As mentioned above, a structured query 410 may be broken into one or more query fragments, where each query fragment is an ordered pair that consists of: i) a predicate of a non-join condition or another expression a structured query; and ii) a context clause that contains the expression or predicate.

For example, the SQL query

SELECT value1.a FROM table1 value1, table2 value2
    WHERE value1.b=15 AND value1.id=value2.id, contains four query fragments:
(value1.a, SELECT),
(table1, FROM),
(table2, FROM), and
(value1.b=15, WHERE).

Embodiments do not consider condition "value1.id=value2.id" to be part of a query fragment because this condition is a join condition. Since subsequent steps of the method of FIG. 5 attempts to identify candidate join paths for pairs of query fragments, there is no reason for embodiments to consider fragments consisting of database elements that are already joined.

In some embodiments, a query fragment that includes an arithmetic operator, such as ">," "<," or "=" may be represented in a more general form that replaces the fragment's operator and literal with placeholders. This convention allows a single query fragment to represent components of a larger number of queries. For example, a query fragment of the form:
(p.year ?op ?val)
could represent an entire class of fragments that include:
(p.year=2019),
(p.year<=2000), or
(p.year>19).

In another example, given the NLQ 400 "Return all papers after 2000," the only possible mapping for keyword "after 2000" might be to the "year" column of a "publication" table of database 460, yielding the query fragment:
(publication.year>2000, WHERE).

But there might be two candidate mappings for keyword "papers" that map the keyword, respectively, to either the "publication" table or to a "journal" table of database 460. This results in two possible query fragments:
(journal.name, SELECT) and
(publication.title, SELECT).

At the conclusion of step 520, NLIDB 4000 will have generated a set of candidate keyword mappings for each keyword extracted in step 510. Each mapping will map one keyword onto exactly one query fragment that consists of or that comprises at least one database element or query expression associated with the mapped keyword in step 510. Only elements and expressions that were found in step 510 to have a semantic meaning sufficiently similar to a semantic meaning of a corresponding keyword are considered. Therefore, when mapping configurations are built from combinations of candidate mappings in step 550, those configurations will include only those mappings most likely to be consistent with the semantic intent of the NLQ 400.

In step 530, NLIDB 4000 retrieves or derives a Query Fragment Graph (QFG) 450, which is an undirected graph that identifies the numbers of times that a previously submitted structured query 410 referenced a particular query fragment or a particular pair of query fragments. In some embodiments, this information is retrieved from archived records of previous structured DBMS queries 410 stored by DBMS 4001 in query log 470. In some embodiments, QFG 450 references only query fragments selected in step 520, but in other embodiments, QFG 450 references all query fragments that can be extracted from any query stored in query log 470. In some embodiments, step 530 may be performed at a different point in the sequence of steps shown in FIG. 5, so long as step 530 is performed prior to step 560.

Figure 6:
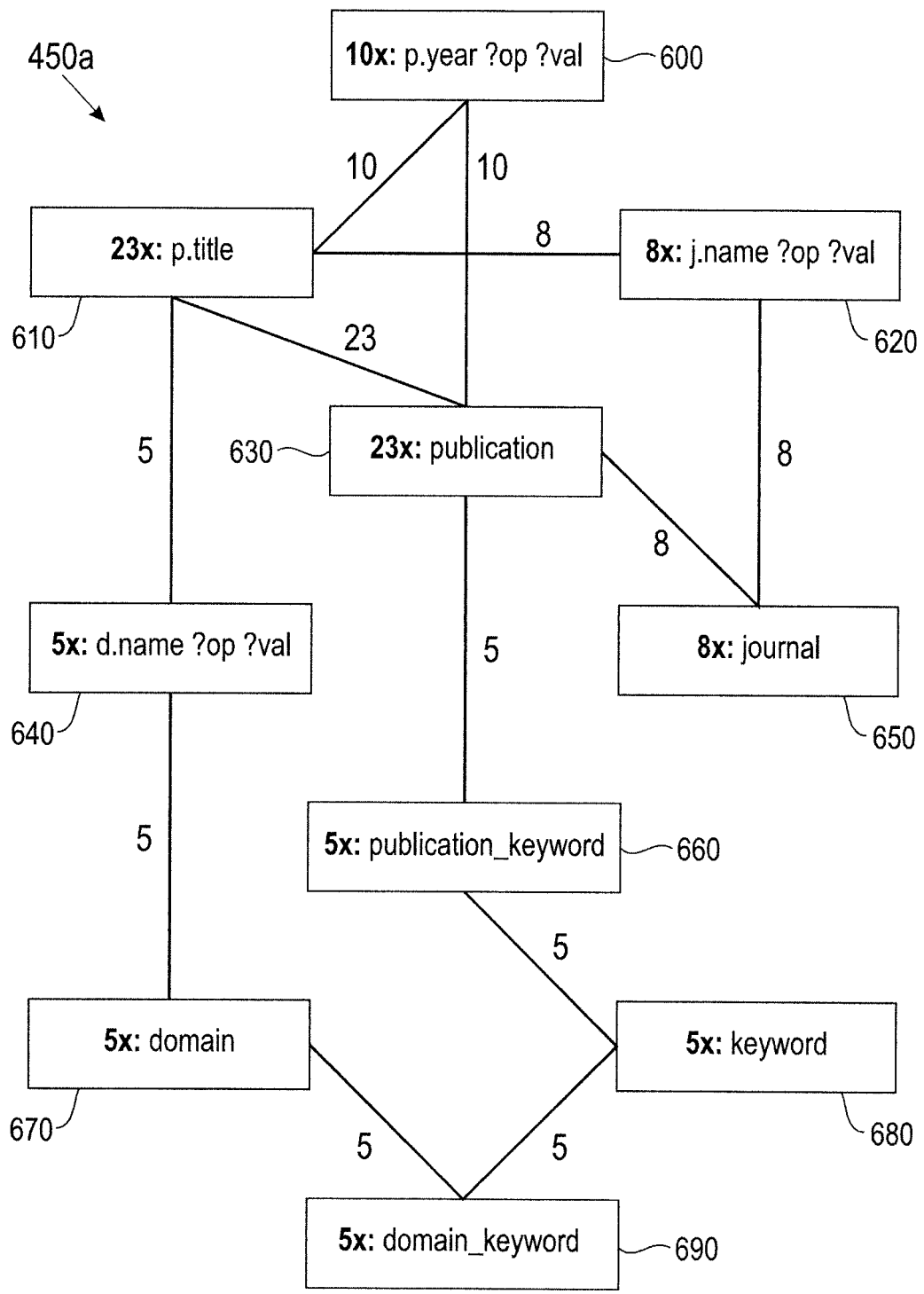
FIG. 6 shows a typical Query Fragment Graph created by an embodiment of the present invention.
Figure 7:
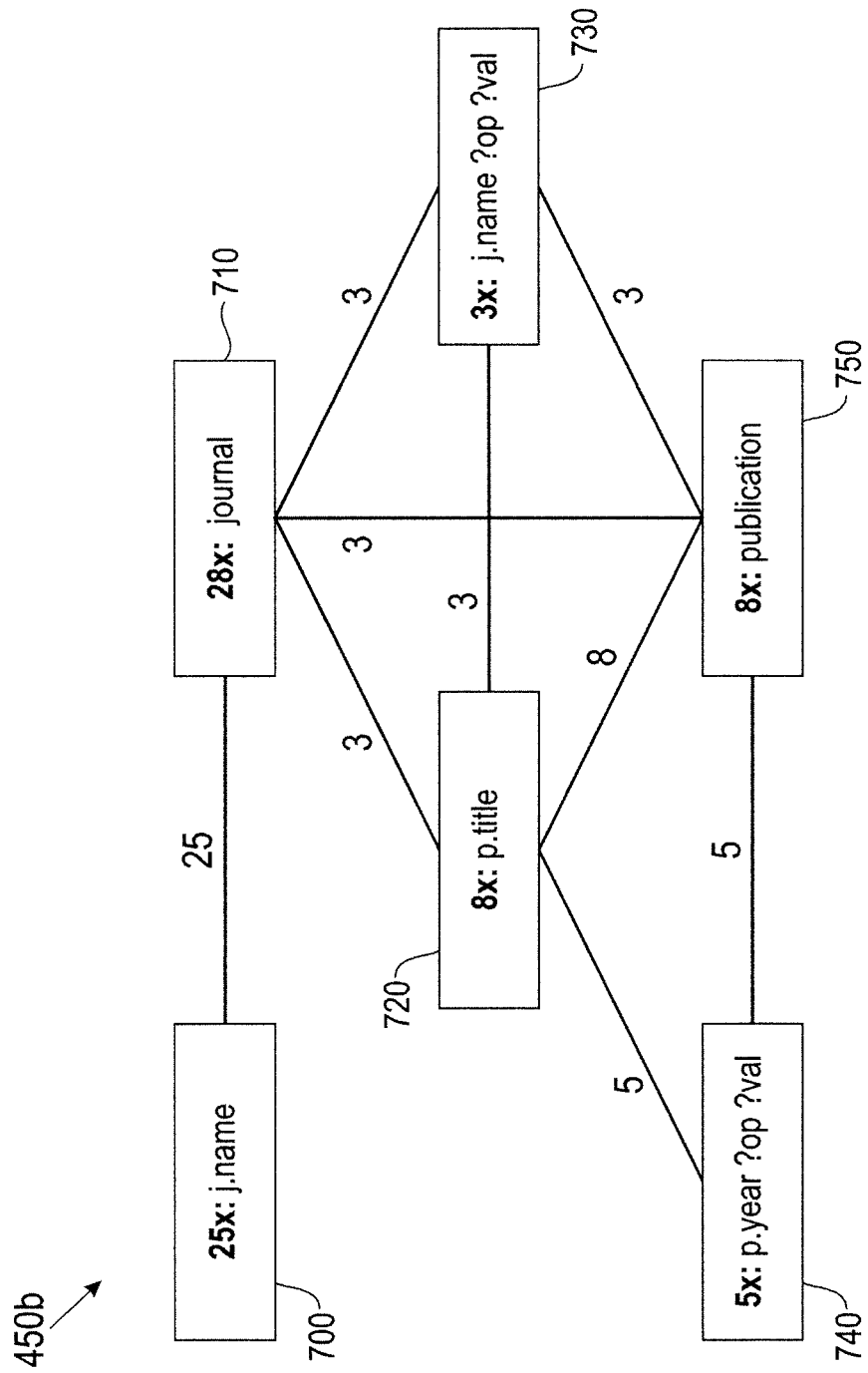
FIG. 7 shows a specific example of a Query Fragment Graph created by an embodiment of the present invention in order to translate a particular natural-language query.

FIGS. 6 and 7 describe the internal structure of QFG 450 in greater detail.

In step 540, NLIDB 4000 scores each candidate mapping by determining a relative degree of similarity between the semantic meanings of the keyword and the query fragment identified by the mapping. As explained in FIG. 4, relative degrees of similarity may be quantified by known cognitive or non-cognitive means, such as by analyzing results produced by one or more similarity models 440, through methods of artificial intelligence or machine learning, or by deriving inferences from contextual information specified by the mapping.

In step 550, NLIDB 4000 generates a set of candidate mapping configurations. Each configuration identifies a unique set of mappings selected from the candidate mappings generated in step 520 and each configuration includes exactly one mapping for every keyword extracted in step 510.

In the running example, which generated mappings:
(journal.name, SELECT) and (publication.title, SELECT)
for keyword "papers" and the mapping
(publication.year>2000, WHERE)
for keyword "after 2000," two candidate mapping configurations are possible:
[(journal.name, SELECT); (publication.year>2000, WHERE)] and
[(publication.title, SELECT); (publication.year>2000, WHERE)].

In some embodiments, NLIDB 4000 builds configurations from only those mappings associated with scores that exceed a predetermined threshold. This threshold may be selected by any method known in the art. An implementer could, for example, choose an empirical method that fine-tunes an initially arbitrary threshold value over the course of multiple iterations of the method of FIG. 5.

In such embodiments, an implementer might arbitrarily choose an initial threshold that builds configurations from the ten highest-scoring mappings of each keyword. These mappings map the keyword to the ten candidate query fragments that produce the ten highest similarity scores. The implementer would then increase this threshold to consider a greater number of mappings for each keyword if the embodiment does not produce sufficiently accurate results, or would lower the threshold if the embodiment takes too long to run. In embodiments where similarity scores are normalized to a value between 0.0 and 1.0, an implementer might instead choose an initial arbitrary threshold that selects any mappings that result in a degree of similarity exceeding 0.75.

In either case, the number of keywords and the resulting number of candidate mappings determine the total number of candidate mapping configurations. For example, if three keywords are extracted from an NLQ 400, and NLIDB 4000 generates 5 to 10 mappings for each keyword, a threshold value that limits each keyword to two candidate mappings would result in eight distinct candidate configurations. Each of these configurations would specify a unique combination of three mappings, one for each of the three keywords, and each mapping would be selected from the two highest-scored mappings associated with each keyword.

At the conclusion of step 550, NLIDB 4000 will have generated a set of candidate configurations. Each candidate configuration will contain a unique combination of mappings that consists of one and only one high-scoring mapping for each extracted keyword.

In step 560, NLIDB 4000 selects an optimal keyword mapping configuration from the candidate configurations identified in step 550. In some embodiments, this step may be performed at least in part by computing, for each configuration, aggregate similarity values for all mappings of that configuration. In such embodiments, the system chooses an optimal configuration as a function of each candidate mapping configuration's aggregate similarity score.

In all cases, however, a candidate configuration is chosen at least in part as a function of the total number of occurrences, or of pairwise co-occurrences, of query fragments identified by mappings of that configuration. As mentioned above, QFG 450 lists the total number of times each fragment occurred in a previously submitted structured query 410. For example, given the two candidate mapping configurations:

[(journal.name, SELECT); (publication.year>2000, WHERE)] and
[(publication.title, SELECT); (publication.year>2000, WHERE)], if QFG 450 reveals that 750 previously submitted structured queries reference attribute "journal.name" and 35 previously submitted structured queries reference attribute "publication.title," NLIDB 4000 may then choose the first of the two candidates as being optimal.

In step 570, NLIDB 4000 selects an optimal join path for database relations and attributes specified by query fragments identified by the optimal mapping configuration. NLIDB 4000 forwards the optimal mapping configuration to join-path generator 430, along with any metadata or descriptions of known relations that an implementer deems to be relevant to the inference of a join path. In some embodiments, NLIDB 4000 also adds contextual information, such as domain-specific knowledge that is extrinsic to data stored in database 460. The join-path generator 430 extracts and scores one or more join paths identified by each relation and selects the highest-scoring path as being the optimal join path most likely to provide results consistent with the intent of the user that submitted NLQ 400. FIG. 6 provides greater detail about how NLIDB 4000 and join-path generator 430 perform this step as a function of statistics stored in QFG 450.

In step 580, NLIDB 4000 generates structured query 410 through a straightforward translation of the highest-scoring configuration and join paths selected in step 570. This query-generation procedure may be performed by any means known in the art, including those used by known NLIDB systems that map keywords and infer join paths through manual means or by mechanisms other than those described in this document.

For example, NLIDB 4000 straightforwardly translates optimal configuration:
[(journal.name, SELECT); (publication.year>2000, WHERE)]
and optimal join path:
(journal, publication)
into structured query 410:
SELECT j.name
 FROM journal j, publication p
 WHERE p.year>2000 AND j.jid=p.jid
or might translate alternate configuration:
[(publication.title, SELECT); (publication.year>2000, WHERE)]
and optimal join path:
(publication, publication)
into alternate structured query 410:
SELECT title FROM publication
 WHERE year>2000.

In step 590, NLIDB 4000 forwards the one or more structured queries 410 generated in step 580 to the next module in the workflow of DBMS 4001, such as a query optimizer. The query is then processed and serviced in a manner consistent with that of known database management systems.

FIG. 6 shows a typical Query Fragment Graph 450 created by an embodiment of the present invention. FIG. 6 shows items 600-690 and item 450*a*, which is identical in form and function to item 450 of FIG. 4.

As described in FIGS. 4 and 5, a query fragment is an ordered pair that consists of: i) a predicate of a non-join condition or another non-join expression of a structured query; and ii) a context clause of a structured query that refers the expression or predicate. Examples of query fragments are:
(userinfo.firstname, SELECT),
(datatable01, FROM), and
(dailysales.productname>1000, WHERE).

In order to simplify FIG. 6 and focus on elements that are most important to the method of FIG. 5, FIG. 6 shows only the predicates and other non-join expressions of query fragments represented by nodes 600-690. Although omitted from the figure and from the below discussion, each query fragment represented by nodes 600-690 also includes a context clause, as described in FIGS. 4 and 5.

A query fragment graph (QFG) 450 is a data structure that records how often database queries incorporate particular query fragments and particular pairs of query fragments. A QFG 450 may be represented in any known form preferred by an implementer. For example, if represented as an undirected graph:

every vertex of the QFG 450 represents a query fragment of a structured query 410, where the structured query 410 was retrieved from a source repository like a DBMS query log 470;

each vertex of the QFG 450 is associated with a number that represents the number of times that the query fragment represented by the vertex occurred in any structured query 410 stored in the source repository;

every edge of the QFG 450 connects vertices representing two query fragments that have been retrieved from the same structured query 410; and any edge that connects vertices that represent two particular query fragments is associated with the number of structured queries 410, retrieved from the source repository, that contain both fragments.

FIG. 6 is an example of such an undirected-graph QFG 450*a* in which objects 600-690 each represent one vertex of QFG 450*a*. The edges connecting the vertices 600-690 each represent the number of times that a structured query of query log 470 contains a particular pair of query fragments.

For example, vertex 650 represents query fragment "journal." The "8X" code embedded into vertex 650 indicates that fragment "journal" appears in eight structured queries 410 retrieved from the source repository.

Vertex 650 is connected by an edge to vertex 630, which represents 23 query instances that contain query fragment "publication." This edge is associated with a value of 8, indicating that query fragments "journal" and "publication" co-occur in eight structured queries 410 retrieved from the source repository.

Other vertices and edges in graph 450*a* provide similar information. For example, an edge connecting vertex 610 to vertex 640 indicates:

query fragment "p.title" appears in 23 retrieved structured queries;

query fragment "d.name ?op ?val" appears in five structured queries;

query fragment "p.title" and "d.name ?op ?val" co-occur in five retrieved structured queries.

As mentioned in FIG. 5, query fragment "d.name ?op ?val" of vertex 640 uses placeholders (represented in this example as "?op" and "?val") to represent a fragment's arithmetic operator and literal. In the example of FIG. 6, this fragment represents five occurrences in query log 470 of structured queries 410 that contain fragments like:
- (d.name=Jane Smith),
- (d.name<D), or
- (d.name>Thomas).

NLIDB 4000 or DBMS 4001 can assemble a QFG 450 in a straightforward manner by simply counting the number of occurrences and co-occurrences of each candidate query fragment stored in a query log 470 or other repository. But because a query log 470 stores copies of every structured query submitted to DBMS 4001, the total number of entries stored in such a log 470 can be enormous. Generating and constantly updating a QFG 450 that includes all possible fragments of submitted structured queries 410 can create an unacceptable burden on DBMS 4001 performance.

Implementers may address this issue by generating a limited QFG 450 for each NLQ 400 received by NLIDB 4000. For example, if NLIDB 4000 receives an NLQ 400 from which may be extracted three query fragments, NLIDB 4000 or DBMS 4001 may, in step 530 of FIG. 5, generate a limited QFG 450 on-the-fly that contains vertices for only those three fragments. This limited QFG 450 may be generated in parallel with other steps of the method of FIG. 5 or may be generated ad hoc by retrieving query fragments, identified by optimal mapping configuration, as needed from a repository like query log 470.

FIG. 7 shows a specific example of a Query Fragment Graph created by an embodiment of the present invention in order to translate a particular natural-language query. FIG. 7 shows items 700-750 and item 450b, which is identical in form and function to items 450 and 450a of FIGS. 4 and 6.

As in FIG. 6, FIG. 7 shows only the predicates and other non-join expressions of query fragments represented by nodes 700-750. Although omitted from the figure and from the discussion below, each query fragment represented by nodes 700-750 also includes a context clause, as described in FIGS. 4 and 5.

In particular, this example shows how an embodiment of the present invention would translate a natural-language query (NLQ 400) "Select all papers from TKTK after 1995" into structured query 410:
SELECT p.title
FROM journal j, publication p
WHERE j.name=TKTK' AND p.year>1995 AND j.jid=p.jid This NLQ 400 contains the following candidate query fragments:
- (j.name, SELECT),
- (journal, FROM),
- (p.year ?op ?val, WHERE)
- (p.title, SELECT),
- (publication, FROM),
- (j.name ?op ?val, WHERE)

which, for the sake of brevity, we abbreviate here as:
j.name
p.title
journal
publication
p.year ?op ?val
j.name ?op ?val NLIDB 4000 determines that query log 470 or other source repository stores instances of three structured queries 410 that each contains occurrences of at least one of the query fragments in the NLQ 400. These instances are:
(1) SELECT j.name FROM journal j (25 instances)
(2) SELECT p.title FROM publication p WHERE p.year>2003 (5 instances)
(3) SELECT p.title FROM journal j, publication p WHERE j.name='TMC' AND p.pid=j.pid (3 instances)

Counting the number of occurrences of each query fragment yields:

| | |
|---|---|
| j.name: | 25 occurrences |
| p.title: | 8 occurrences |
| journal | 28 occurrences |
| publication | 8 occurrences |
| p.year ?op ?val | 5 occurrences |
| j.name ?op ?val | 3 occurrences |

NLIDB 4000 uses this information to construct the undirected graph QFG 450b. Each query fragment and the number of times that query occurs in any retrieved structured query 410 are represented by one vertex of vertices 700-750. If a pair of vertices 700-750 represents a pair of query fragments that co-occur in at least one of the retrieved structured queries 410, those vertices are connected by an edge that identifies the total number of times that the pair co-occur in one of the retrieved structured queries 410.

For example, the edge between vertex 700 and vertex 710 represents that query fragment "j.name" and query fragment "journal" co-occur in 25 retrieved structured queries 410, as shown in query (1) above. Similarly, the edge between vertex 720 and vertex 750 represents that query fragment "p.title" and query fragment "publication" co-occur in 8 retrieved structured queries 410, as show in queries (2) and (3) above.

Unlike known NLIDB technologies, this approach allows NLIDB 4000 to generate queries unlike any of the retrieved structured queries 410, rather than being constrained to merely selecting a previously logged query. One advantage of the present invention, therefore, is its ability to build new structured queries 410 from query fragments broken out of previously submitted queries.

In this example, it is possible to map the keyword "papers" contained in NLQ 400 onto either database column "publication.title" or database column "journal.name." An existing NLIDB that is able to consider only entire structured queries can generate only structured queries 410 that are similar to previously submitted queries. In this case, such an NLIDB might simply translate the NLQ 400 to a structured query 410 "SELECT j.name FROM journal j" (query (1) above) without considering other options because there are 25 instances of this query among the retrieved structured queries 410.

The ability to break down the retrieved queries 410 into more granular query fragments allows NLIDB 4000 to independently evaluate and select query fragments and then reassemble those fragments in new ways to generate novel structured queries 410. Counting occurrences of each combination of query fragments, rather than merely counting entire previously submitted queries, thus provides a more accurate way to estimate the likelihood that a particular mapping configuration and join path accurately represent a user's intent.

Simply scoring a query fragment in proportion to the number of times the fragment occurs in query log 470 may not always result in optimal keyword mapping. This may occur, for example, when a fragment occurs in previously submitted structured queries 410 numerous times, but those instances occur within contexts unrelated to the context of a corresponding keyword of NLQ 400. By considering only query fragments, embodiments of the present invention thus consider an instance of a fragment of a previously submitted query only when that query places the fragment in context similar to the context of the corresponding keyword.

Exemplary NLQ 400 ("Select all papers from TKTK after 1995") contains three keywords: "papers," "TKTK," and "after 1995." An improved NLIDB 4000 that incorporates cognitive capabilities considers the contexts of keywords "papers" and "TKTK" in NLQ 400 to infer that, if "TKTK" is the name of a journal and "after 1995" refers to a year, "papers" should not be mapped onto database column "journal.name" because such a mapping would make NLQ 400 would be semantically redundant as a request to access to "all journals from a journal."

Analogous methods may be used to facilitate the selection of an optimal join path. Once NLIDB 4000 has selected keyword mappings most likely to represent the intent of the user submitting NLQ 400, a join path may be selected as a function of the values of each QFG 450 edge.

For example, in FIG. 7, if it is otherwise unclear whether fragment "j.name" or fragment "p.title" should be joined to fragment "journal," NLIDB 4000 may compare the number of times that each candidate pairing occurred in a previously logged structured query 410. Because the edge connecting nodes 700 and 710 indicates that "j.name" and "journal" co-occurred 25 times, while the edge connecting nodes 710 and 720 indicates that "p.title" and "journal" co-occurred three times, NLIDB 4000 would infer that a join path between "j.name" and "journal" would yield a structured query 410 most likely to be semantically consistent with a user's intent.

Depending on the effect of additional metadata and contextual information, these steps could result in the generation of the structured query 410:

SELECT p.title
   FROM journal j, publication p
   WHERE j.name ?op ?val AND p.year ?op ?val AND
      j.jid=p.jid This query 410 may be made specific to the original NLQ 400 by replacing the placeholders with operators and literals extracted from NLQ 400:

SELECT p.title
   FROM journal j, publication p
   WHERE j.name=TKTK' AND p.year>1995 AND
      j.jid=p.jid Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A method for generating a structured database query from a natural-language database query, the method comprising:
   receiving, by a database management system (DBMS), a natural-language query (NLQ) submitted by a user of the DBMS, wherein the NLQ requests access to information organized into at least two elements of a database managed by the DBMS, wherein each element of the at least two elements is either a relation of the database or an attribute of the database;
   extracting, by the DBMS, a set of keywords from the NLQ;
   selecting, by the DBMS, a set of candidate mapping configurations, wherein each configuration of the set of candidate mapping configurations identifies a unique combination of keyword mappings that maps the entire set of extracted keywords onto a set of query fragments;
   retrieving, by the DBMS, a query fragment graph (QFG) that counts occurrences, in previously logged structured queries, of each query fragment identified by a keyword mapping of any configuration of the set of candidate mapping configurations;
   choosing, by the DBMS, an optimal configuration from the set of candidate mapping configurations,
      wherein the optimal configuration identifies an optimal set of query fragments, and
      wherein the optimal set of query fragments contains pairs of query fragments that are identified by the QFG as co-occurring in the previously logged structured queries more frequently than do pairs of query fragments identified by other configurations of the candidate mapping configurations;
   generating, by the DBMS, a structured query that comprises the optimal set of query fragments; and
   forwarding the structured query, by the DBMS, to a downstream component of the DBMS.

2. The method of claim 1, wherein each query fragment of the set of query fragments is an ordered pair that includes:
   i) a first element selected from the group consisting of: (a) an expression that is contained in a particular structured query and that references at least one relation and/or attribute of the database and (b) a predicate of a non-join condition contained in the particular structured query, and
   ii) a second element that comprises a context clause, of the particular structured query, that places a condition upon the first element.

3. The method of claim 1,
   wherein a first keyword mapping of any candidate mapping configuration maps a first keyword of the set of extracted keywords onto a corresponding query fragment of the set of query fragments,
   wherein a first semantic meaning of the first keyword and a second semantic meaning of the corresponding query fragment are determined to have a degree of similarity exceeding a first threshold value; and
   wherein the degree of similarity between the first semantic meaning and the second semantic meaning is determined from a similarity score returned by a similarity model that quantifies textual similarities between character strings.

4. The method of claim 3,
   wherein each pair of candidate mapped keywords, of each mapping of each candidate mapping configuration, has a corresponding pair of semantic meanings that have a degree of similarity exceeding a second threshold value, and wherein the second threshold value is equal to or greater than the first threshold value.

5. The method of claim 1, wherein the QFG lists the number of times that each distinct pair of query fragments co-occurred in any of the previously logged structured queries, and wherein each query fragment of each distinct pair is identified by a keyword mapping of a candidate mapping configuration.

6. The method of claim 1, wherein the QFG is represented as an undirected graph, wherein each vertex of the undirected graph represents the number of times that a corresponding query fragment occurred in the previously logged structured queries, and wherein each edge of the undirected graph that connects a pair of vertices represents the number of times that a pair of query fragments represented by the pair of vertices co-occurred in any query of the previously logged structured queries.

7. The method of claim 1, wherein the DBMS performs at least one of the extracting, the selecting, the choosing, and the inferring as a function of metadata managed by the DBMS, and wherein the metadata is selected from the group consisting of:
 metadata generated by a parsing operation performed on the NLQ while extracting the set of keywords from the NLQ,
 contextual metadata from which can be inferred a semantic meaning of a portion of the NLQ, of a keyword, and/or of a database table or attribute,
 entries of a lexicon that associates a natural-language word with an expression of a structured query language, and
 a description of a sub-schema of the database.

8. A method for inferring a join path from a natural-language database query, the method comprising:
 receiving, by a database management system (DBMS), a natural-language query (NLQ) submitted by a user of the DBMS, wherein the NLQ requests access to information organized into at least two elements of a database managed by the DBMS, wherein each element of the at least two elements is either a relation of the database or an attribute of the database;
 extracting, by the DBMS, a set of keywords from the NLQ;
 selecting, by the DBMS, a set of candidate mapping configurations, wherein each configuration of the set of candidate mapping configurations consists of a unique combination of keyword mappings that maps the entire set of extracted keywords onto a set of query fragments;
 retrieving, by the DBMS, a query fragment graph (QFG) that counts occurrences, in previously logged structured queries, of each query fragment identified by a keyword mapping of any configuration of the set of candidate mapping configurations;
 choosing, by the DBMS, an optimal configuration from the set of candidate mapping configurations as a function of information contained in the QFG;
 identifying, by the DBMS, that the optimal configuration comprises at least two keyword mappings, wherein each of the at least two keyword mappings spans two or more tables of the database;
 inferring, by the DBMS, an optimal join path by comparing the relative numbers of times that each distinct pair of query fragments, of an optimal set of query fragments, co-occurred in a query of the previously logged structured queries,
  wherein the optimal join path joins at least two query fragments, of the optimal set of query fragments, each of which represents a keyword of one of the at least two keyword mappings;
 generating, by the DBMS, a structured query that comprises the optimal join path, and
  wherein the optimal set of query fragments contains query fragments, occurring in the previously logged structured queries, and co-occurring in any candidate configuration of the set of candidate mapping configurations more often than does any set of query fragments identified by other configurations of the candidate mapping configurations; and
 forwarding the structured query, by the DBMS, to a downstream component of the DBMS.

9. The method of claim 8, wherein the inferring the optimal join path comprises comparing the relative number of times that each distinct pair of query fragments, of the optimal set of query fragments, co-occurred in a query of the previously logged structured queries, wherein the optimal join path joins at least two query fragments, of the optimal set of query fragments, and wherein each fragment of the at least two query fragments represents a keyword specified by one of the keyword mappings that span two or more tables of the database.

10. The method of claim 8, wherein the optimal configuration identifies the optimal set of query fragments, and wherein the optimal set of query fragments contains pairs of query fragments that are identified by the QFG as co-occurring in any of the previously logged structured queries more frequently than do pairs of query fragments identified by other configurations of the candidate mapping configurations.

11. The method of claim 8, wherein the structured query comprises statements formatted in the Structured Query Language (SQL), and wherein at least one of the statements contains an expression comprising the optimal join path and at least two query fragments of the optimal set of query fragments.

12. The method of claim 8, wherein each query fragment of the set of query fragments is an ordered pair that includes:
 i) a first element selected from the group consisting of: (a) an expression that is contained in a particular structured query and that references at least one relation and/or attribute of the database and (b) a predicate of a non-join condition contained in the particular structured query, and
 ii) a second element that comprises a context clause, of the particular structured query, that places a condition upon the first element.

13. The method of claim 8, wherein a first keyword mapping of any candidate mapping configuration maps a first keyword of the set of extracted keywords onto a corresponding query fragment of the set of query fragments, wherein a first semantic meaning of the first keyword and a second semantic meaning of the corresponding query fragment are determined to have a degree of similarity exceeding a first threshold value; and wherein the degree of similarity between the first semantic meaning and the second semantic meaning is determined from a similarity score returned by a similarity model that quantifies textual similarities between character strings.

14. The method of claim 8, wherein the QFG lists the number of times that each distinct pair of query fragments co-occurred in a single query of the previously logged structured queries, and wherein each query fragment of each distinct pair is identified by a keyword mapping of a candidate mapping configuration.

15. The method of claim 8, wherein the DBMS performs at least one of the extracting, the selecting, the choosing, and the inferring as a function of metadata managed by the DBMS, and wherein the metadata is selected from the group consisting of:
  metadata generated by a parsing operation performed on the NLQ while extracting the set of keywords from the NLQ,
  contextual metadata from which can be inferred a semantic meaning of a portion of the NLQ, of a keyword, or of a database table or attribute,
  entries of a lexicon that associates a natural-language word with an expression of a structured query language, and
  a description of a sub-schema of the database.

16. A computer program product, comprising a computer-readable hardware storage device having a computer-readable program code stored therein, the program code configured to be executed by a database management system (DBMS) comprising a processor, a memory coupled to the processor, and a computer-readable hardware storage device coupled to the processor, the storage device containing program code configured to be run by the processor via the memory to implement a method for a natural-language database interface with automated keyword mapping and join-path inferences, the method comprising:

receiving, by the DBMS, a natural-language query (NLQ) submitted by a user of the DBMS, wherein the NLQ requests access to information organized into at least two elements of a database managed by the DBMS, wherein each element of the at least two elements is either a relation of the database or an attribute of the database;

extracting, by the DBMS, a set of keywords from the NLQ;

selecting, by the DBMS, a set of candidate mapping configurations, wherein each configuration of the set of candidate mapping configurations identifies a unique combination of keyword mappings that maps the entire set of extracted keywords onto a set of query fragments;

retrieving, by the DBMS, a query fragment graph (QFG) that counts occurrences, in previously logged structured queries, of each query fragment identified by a keyword mapping of any configuration of the set of candidate mapping configurations;

choosing, by the DBMS, an optimal configuration from the set of candidate mapping configurations,
    wherein the optimal configuration identifies an optimal set of query fragments, and
    wherein the optimal set of query fragments contains pairs of query fragments that are identified by the QFG as co-occurring in the previously logged structured queries more frequently than do pairs of query fragments identified by other configurations of the candidate mapping configurations;

generating, by the DBMS, a structured query that comprises the optimal set of query fragments; and forwarding the structured query, by the DBMS, to a downstream component of the DBMS.

17. The computer program product of claim 16, further comprising
  identifying, by the DBMS, that the optimal configuration comprises at least two keyword mappings, wherein each of the at least two keyword mappings spans two or more tables of the database;
  inferring, by the DBMS, an optimal join path by comparing the relative numbers of times that each distinct pair of query fragments, of an optimal set of query fragments, co-occurred in a query of the previously logged structured queries,
    wherein the optimal join path joins at least two query fragments, of the optimal set of query fragments, each of which represents a keyword of one of the at least two keyword mappings, and
    wherein the structured query comprises the optimal join path.

18. The computer program product of claim 16, wherein each query fragment of the set of query fragments is an ordered pair that includes:
  i) a first element selected from the group consisting of: (a) an expression that is contained in a particular structured query and that references at least one relation and/or attribute of the database and (b) a predicate of a non-join condition contained in the particular structured query, and
  ii) a second element that comprises a context clause, of the particular structured query, that places a condition upon the first element.

19. The computer program product of claim 16,
  wherein a first keyword mapping of any candidate mapping configuration maps a first keyword of the set of extracted keywords onto a corresponding query fragment of the set of query fragments,
  wherein a first semantic meaning of the first keyword and a second semantic meaning of the corresponding query fragment are determined to have a degree of similarity exceeding a first threshold value; and
  wherein a relative degree of similarity between the first semantic meaning and the second semantic meaning is determined from a similarity score returned by a similarity model that quantifies textual similarities between character strings.

20. The computer program product of claim 16,
  wherein the DBMS performs at least one of the extracting, the selecting, the choosing, and the inferring as a function of metadata managed by the DBMS, and
  wherein the metadata is selected from the group consisting of:
    metadata generated by a parsing operation performed on the NLQ while extracting the set of keywords from the NLQ,
    contextual metadata from which can be inferred a semantic meaning of a portion of the NLQ, of a keyword, and/or of a database table or attribute,
    entries of a lexicon that associates a natural-language word with an expression of a structured query language, and
    a description of a sub-schema of the database.

21. A method, comprising:

creating a Query Fragment Graph (QFG) data structure that identifies a number of co-occurrences of query fragments that occur within any query of a set of structured queries stored in a log of a database;

given a keyword extracted from a Natural Language Query (NLQ), using the QFG data structure to rank a set of keyword mappings,
- wherein each mapping of the keyword mappings associates the keyword with an attribute or relation of the database, and
- wherein each ranked mapping is each ranked as a function of a relative number of occurrences, in the set of structured queries, of a database attribute or relation associated with the keyword by the ranked mapping;

given an attribute or relation associated with the keyword by one of the keyword mappings, using the QFG data structure to identify a ranked list of join paths,
- wherein each ranked join path joins the associated attribute or relation to another attribute or relation of the database, and
- wherein the ranked join paths are each ranked as a function of a relative number of occurrences, in the set of structured queries, of each ranked join path; and using a Natural Language Interface for Databases (NLIDB) to translate the NLQ into a translated structured query that incorporates a highest-ranked join path,
- wherein the translated structured query has a semantic meaning analogous to an intended meaning of the NLQ.

* * * * *